United States Patent [19]

Furukawa et al.

[11] Patent Number: 4,820,599
[45] Date of Patent: Apr. 11, 1989

[54] NON-AQUEOUS ELECTROLYTE TYPE SECONDARY CELL

[75] Inventors: Nobuhiro Furukawa, Hirakata; Toshihiko Saito, Kyoto; Ikuro Nakane; Hiroshi Watanabe, both of Hirakata, all of Japan

[73] Assignee: Sanyo Electric Co., Ltd., Osaka, Japan

[21] Appl. No.: 195,046

[22] Filed: May 17, 1988

[30] Foreign Application Priority Data

May 18, 1987 [JP] Japan .................... 62-120801

[51] Int. Cl.⁴ .............................................. H01M 6/14
[52] U.S. Cl. .................................... 429/194; 429/218
[58] Field of Search ............... 429/218, 209, 194, 197, 429/249; 252/182.1; 420/529

[56] References Cited

U.S. PATENT DOCUMENTS 4,758,484 7/1988 Furukawa et al. ................. 425/194

FOREIGN PATENT DOCUMENTS 60-89068 5/1985 Japan .
61-66369 4/1986 Japan .

*Primary Examiner*—Anthony Skapars
*Attorney, Agent, or Firm*—Armstrong, Nikaido, Marmelstein & Kubovcik

[57] ABSTRACT

A rechargeable non-aqueous secondary cell comprises, as main components thereof, a positive electrode, a negative electrode, a separator disposed between the positive electrode and negative electrode, and a non-aqueous electrolyte. The positive electrode includes a rechargeable active material, and the negative electrode is formed of lithium-aluminum alloy and has an aluminum plate added with manganese as a base material.

20 Claims, 2 Drawing Sheets

NON-AQUEOUS ELECTROLYTE TYPE SECONDARY CELL

BACKGROUND OF THE INVENTION (1) Field of the Invention

The present invention relates to a secondary cell of the non-aqueous electrolyte type in which lithium is used as the active material for the negative electrode, and manganese oxide, molybdenum trioxide, vanadium pentoxide, titanium sulfide or the like as the active material for the positive electrode.

(2) Description of the Prior Art

This type of cell has the disadvantage of having a very limited period for charge and discharge cycles. It is due to the fact that lithium used as the active material for the negative electrode grows in dendritic forms on surfaces of the negative electrode into contact with the positive electrode to bring about internal short-circuits or becomes deposited in mossy forms and falls from the electrode surfaces.

In order to overcome the above disadvantage, a proposal has been made to form the negative electrode with lithium-aluminum alloy as disclosed in Japanese Patent Publication Kokai No. 52-5423.

Where lithium is used alone as the active material for the negative electrode at the charging time, an elution of lithium ions from the negative electrode render the negative electrode surfaces uneven. At the charging time that follows, lithium becomes deposited in dendritic forms concentratedly on higher positions of the negative electrode surfaces. On the other hand, the use of lithium-aluminum alloy is effective to check such dendritic deposition of lithium since, at the time of charging, lithium is reinstated to form the alloy with aluminum acting as the base of the negative electrode.

However, where the negative electrode is formed of lithium-aluminum alloy using a pure aluminum as the base material of the electrode, the base becomes brittle through repeated charging and discharging. The base will ultimately crumble, thereby deteriorating the cell performance.

Where aluminum alone is alloyed with lithium, the alloy includes $\beta$-phase aluminum-lithium alloy formed locally therein which contributes to cell reaction, namely occludes and releases lithium. This $\beta$-phase aluminum-lithium alloy is itself brittle, and expands and contracts with the occlusion and release of lithium. As a result, the entire alloy becomes lower in mechanical strength and falls from the negative electrode occur with repeated charging and discharging.

Further, lithium-aluminum alloy causes changes in the electrode configuration with charging and discharging. Therefore, with an increase in the number of repeated charging and discharging, the cell reaction gradually becomes ununiform and lithium becomes unevenly distributed to a greater extent in the electrode. Consequently, the electric potential becomes more negative (i.e. has a higher degree of activity) at locations of high lithium concentration, which readily permits reduction of a solvent acting as an electrolyte.

This unfavorable situation has led to a further proposal, as disclosed in Japanese Patent Publication Kokai No. 61-66369, to add copper or silicon to lithium-aluminum alloy. However, this proposal does not provide satisfactory cell performance for practical purposes.

SUMMARY OF THE INVENTION

A primary object of the present invention, therefore, is to provide a secondary cell of the non-aqueous electrolyte type having improved charge and discharge cycle characteristics.

Another object of the invention is to provide a secondary cell of the non-aqueous electrolyte type which is effective to prevent the negative electrode base from becoming brittle with repeated charging and discharging.

A further object of the invention is to provide a secondary cell of the non-aqueous electrolyte type which is effective to prevent the negative electrode from expanding and contracting as a result of occlusion and release of lithium and to maintain uniform cell reaction.

The above objects are fulfilled according to the present invention by a rechargeable non-aqueous secondary cell comprising a positive electrode having a rechargeable active material as a main component, a negative electrode formed of lithium-aluminum alloy and using an aluminum plate added with manganese as a base material, a separator disposed between the positive electrode and the negative electrode, and a non-aqueous electrolyte.

The objects of the present invention are fulfilled also by a rechargeable non-aqueous secondary cell comprising a positive electrode having a rechargeable active material as a main component, a negative electrode formed of lithium-aluminum alloy including manganese in solid solution phases and $MnAl_6$, a separator disposed between the positive electrode and the negative electrode, and a non-aqueous electrolyte.

Preferably, manganese is added in 0.1 to 6.0 wt. % with respect to aluminum.

The active material for the positive electrode may comprise a manganese oxide.

In a preferred embodiment of the invention, the manganese oxide is selected from the group consisting of manganese dioxide, a manganese oxide including lithium or other metals, $Li_2MnO_3$, manganese dioxide including $Li_2MnO_3$, spinel type $Li_2MnO_4$.

The foregoing objects of the invention are fulfilled by the described constructions for the following reason:

Aluminum added with manganese includes manganese in solid solution phases and $MnAl_6$ which is an intermetallic compound, present in aluminum. These phases have a smaller lattice constant than that of pure aluminum, and therefore are not easily reactive to lithium. Consequently, there are, in aluminum, portions which are easily alloyed with lithium and portions which are not. The portions not easily alloyed retain $\beta$-phase aluminum-lithium alloy and check expansion and contraction in the volume incidental to the occlusion and release of lithium. This results in an improved mechanical strength of the entire alloy, thereby to check falling of the negative electrode. On the other hand, aluminum added with copper, silicon, iron, zirconium, nickel, cobalt or vanadium has a lattice constant not less than that of pure aluminum, and none of these substances have a retentive function. Thus, such an addition is not effective for preventing or checking the presence of brittle $\beta$-phase alloy in aluminum-lithium alloy or falling of the negative electrode due to the changes in its volume incidental to the occlusion and release of lithium. Where manganese is added to aluminum, the lithium-aluminum alloy has a crystal structure with an increased distortion, thereby to increase the strength of the lithium-aluminum alloy. Consequently, the changes in the electrode configuration due to the charging and discharging are checked to render the negative electrode reaction uniform, thereby avoiding uneven distribution of lithium in the negative electrode. This obstructs a reduction of the solvent forming the electrolyte. These features are believed effective to improve the charge and discharge cycle characteristics of the non-aqueous secondary cell.

The above advantage is further promoted, according to the present invention, by adding manganese in 0.1 to 6.0 wt. % with respect to aluminum. This is because the advantage will be minimal if manganese is added in less than 0.1 wt. % which is too small an amount, and the base will become brittle if manganese is added in an amount exceeding 6.0 wt. %.

The above advantage is also promoted where the active material for the positive electrode comprises a manganese oxide. Where a manganese oxide is used as the active material for the positive electrode, manganese becomes dissolved at the charging times. If the negative electrode comprised as its base a known aluminum plate without manganese added thereto, manganese would become deposited on the negative electrode to form a uniform and dense manganese layer thereon, which impairs reactivity of the negative electrode. In the case of the negative electrode using an aluminum added with manganese as a base material, the manganese dissolved from the positive electrode will be deposited, with priority, on the manganese of the negative electrode, whereby a uniform layer is hardly formed on the negative electrode. This is believed the reason for minimizing the detrimental effect produced on the reactivity of negative electrode.

BRIEF DESCRIPTION OF THE DRAWINGS

The above and other objects, advantages and features of the invention will become apparent from the following description thereof taken in conjunction with the accompanying drawings, in which.

DESCRIPTION OF THE PREFERRED EMBODIMENT

An embodiment of the present invention will be described in detail hereinafter.

Figure 1:
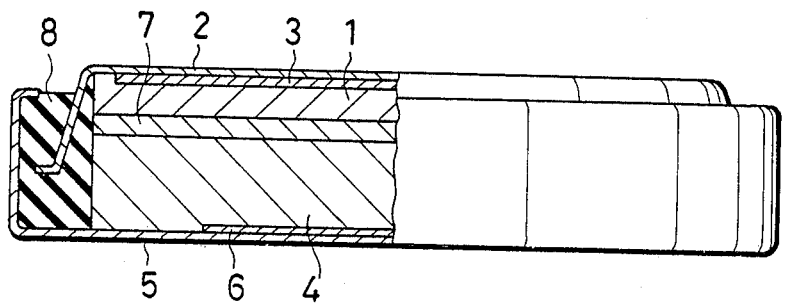
FIG. 1 is a half section of a cell according to the present invention.

FIG. 1 shows a half section of a flat type non-aqueous secondary cell fabricated in accordance with the present invention. The cell comprises a negative electrode 1 constituting the gist of the present invention, which is prepared by a process as described later, a negative can 2, and a negative collector 3 secured to a bottom inside surface of the can 2. The negative electrode 1 is pressed upon the collector 3.

The cell further comprises a positive electrode 4 prepared by adding 10 parts by weight of acetylene black acting as a conductive agent and 10 parts by weight of fluororesin acting as a binder to 80 parts by weight of manganese dioxide acting as an active material, fully mixing these components and thereafter subjecting the mixture to pressure molding. The positive electrode 4 is pressed upon a positive collector 6 secured to the bottom inside surface of a positive can 5. Number 7 indicates a separator formed of a porous polypropylene membrane and impregnated with a non-aqueous electrolyte. The electrolyte comprises 1 mol/lit. of lithium perchlorate dissolved in a solvent mixture of propylene carbonate and 1,2-dimethoxyethane. Number 8 indicates an insulating packing. This cell is 24.0 mm in diameter and 3.0 mm in height.

The negative electrode 1 is formed of lithium-aluminum alloy and using an aluminum base added with a varied amount of manganese and immersed in the electrolyte comprising 1 mol/lit. of lithium perchlorate dissolved in the solvent mixture of propylene carbonate and 1,2-dimethoxyethane. The lithium-aluminum alloy is subjected to an electrochemical alloying method using a metallic lithium plate as a counter electrode on condition that an electric capacities 200 mAH with a current density of 0.5 mA/cm$^2$. The atomic ratio between lithium and aluminum is 30:70.

The table below shows mechanical characteristics according to different amounts of manganese added to the aluminum base, and cells corresponding to the negative electrodes using the resulting bases.

| | | | mechanical characteristics | |
|---|---|---|---|---|
| | metallic addition | amount added (VsAl) | tensile strength | Vickers hardness |
| Cell A1 of Invention | manganese | 1.0 wt % | 23 kg/mm$^2$ | 77 |
| Cell A2 of Invention | manganese | 5.0 wt % | 34 kg/mm$^2$ | 96 |
| Comparative Cell B | none | — | 17 kg/mm$^2$ | 50 |

As seen from the above table, Comparative Cell B comprises a negative electrode without manganese having mechanical characteristics with a tensile strength of 17 kg/mm$^2$ and Vickers hardness of 50. In the case of Cell A1 of the present invention, the negative electrode added with 1.0 wt. % of manganese has such mechanical characteristics that the tensile strength is 23 kg/mm$^2$ and Vickers hardness is 77. In Cell A2 of the invention, the negative electrode added with 5.0 wt. % of manganese has even more improved mechanical characteristics with the tensile strength at 34 kg/mm$^2$ and Vickers hardness at 96. Thus, Cells A1 and A2 of the invention are far superior in mechanical characteristics to Comparative Cell B.

Figure 2:
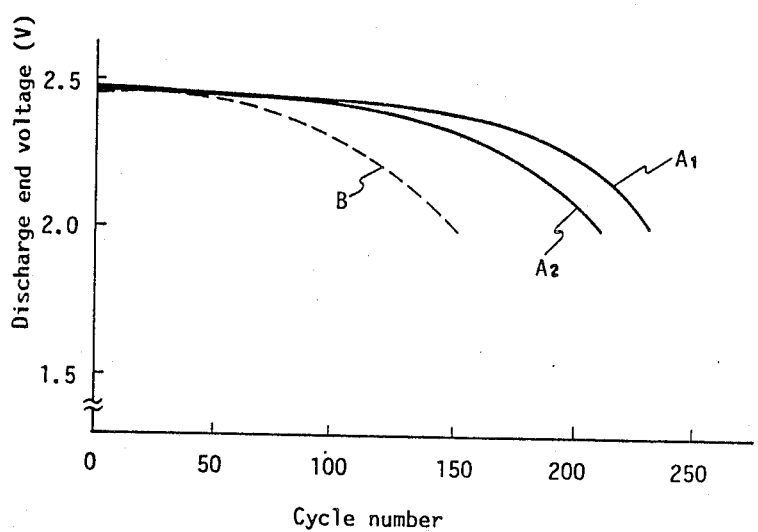
FIG. 2 is a graph showing charge and discharge cycle characteristics of cells A1 and A2 according to the present invention which comprise negative electrodes prepared by using aluminum bases added with different amounts of manganese, and of comparative cell B.

Cycle characteristics of Cells A1 and A2 of the invention and Comparative Cell B were checked and the results are shown in FIG. 2. The testing conditions were such that the cells were charged in a current of 2.5 mA for six hours, and were discharged in a current of 2.0 mA for six hours. The cell life was regarded as having ended when the cell voltage fell to 2.0V within the discharging time.

As seen from FIG. 2, Comparative Cell B has the discharge ending voltage at 2.0V around the 150th cycle whereas Cells A1 and A2 of the invention do not have the discharge ending voltage at 2.0V until after the 200th cycle. Thus Cells A1 and A2 of the invention are far superior to Comparative Cell B in cycle characteristics also.

Figure 3:
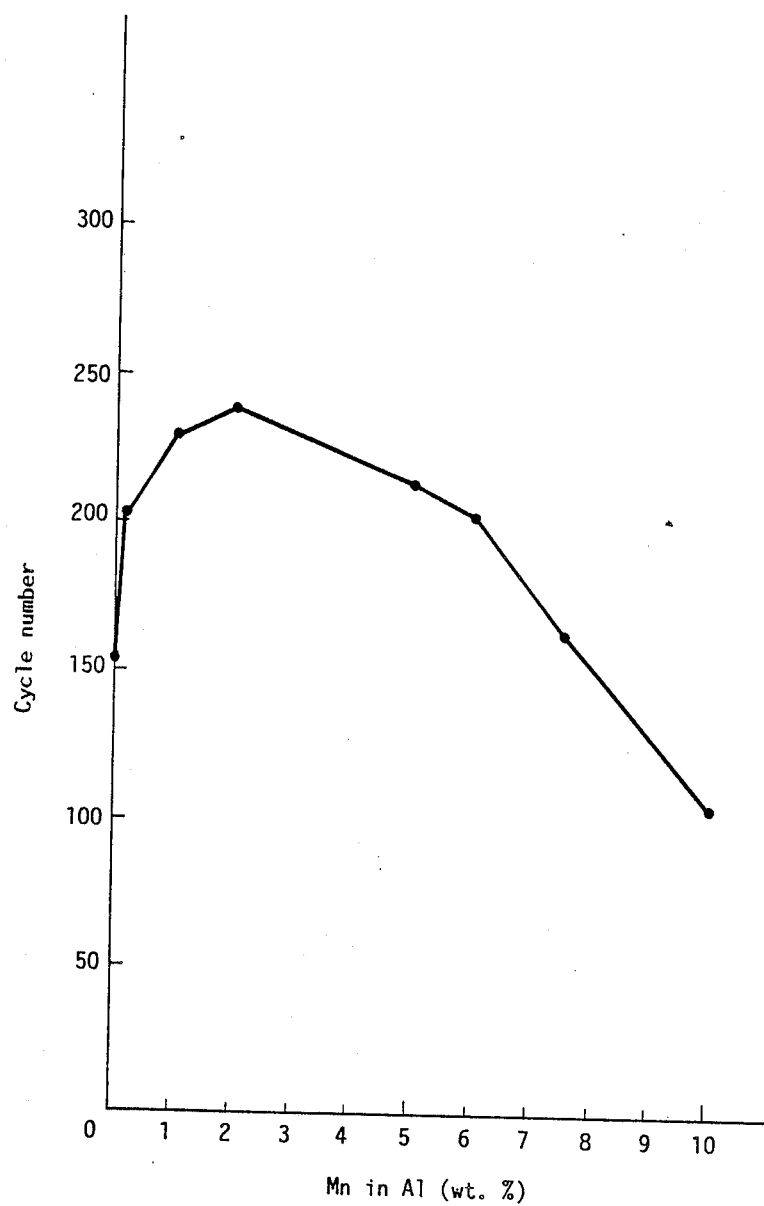
FIG. 3 is a graph showing the relationship between the amount of manganese added to alminum and the number of cycles of the cell.

Further, the relationship between the amount of manganese in aluminum and the number of cycles of the cells was checked and the results are shown in FIG. 3.

As seen from FIG. 3, the cell life exceeds the 200th cycle where manganese is added in amounts ranging from 0.1 to 6.0 wt. % with respect to aluminum. Thus, manganese should preferably be added in an amount within the above range.

One specific example of the method for preparing an aluminum plate added with manganese comprises the steps of allowing a melt mixture of manganese and aluminum to solidify and then rolling the mixture. Another example comprises the steps of allowing a melt mixture of manganese and aluminum to solidify, pulverizing the mixture and subjecting the resulting powder to a mold under pressure.

An electrochemical process given as an example adopted for alloying lithium and aluminum according to the present invention, but it is not limited to this process ative and a metallurgical process may be used instead.

In addition, where the aluminum plate added with manganese as above is used as the negative electrode base, it is preferable to use a manganese oxide as the active material for the positive electrode. The manganese oxide may comprise manganese dioxide, a manganese oxide including lithium or other metals, $Li_2MnO_3$, manganese dioxide including $Li_2MnO_3$, spinel type $Li_2MnO_4$ or the like.

What is claimed is:

1. A rechargeable non-aqueous secondary cell comprising;
   a positive electrode having a rechargeable active material as a main component,
   a negative electrode formed of lithium-aluminum alloy and having an aluminum plate added with manganese as a base,
   a separator disposed between said positive electrode and said negative electrode, and
   a non-aqueous electrolyte.

2. A cell as claimed in claim 1 wherein manganese is added in 0.1 to 6.0 wt. % with respect to aluminum.

3. A cell as claimed in claim 1 wherein the active material for the positive electrode comprises a manganese oxide.

4. A cell as claimed in claim 3 wherein said manganese oxide is selected from the group consisting of manganese dioxide, a manganese oxide including lithium or other metals, $Li_2MnO_3$, manganese dioxide including $Li_2MnO_3$, spinel type $Li_2MnO_4$.

5. A cell as claimed in claim 1 further comprising a negative can, and a negative collector secured to a bottom inside surface of said negative can.

6. A cell as claimed in claim 5 wherein said negative electrode is pressed upon said negative collector.

7. A cell as claimed in claim 1 further comprising a positive can, and a positive collector secured to a bottom inside surface of said positive can.

8. A cell as claimed in claim 7 wherein said positive electrode is pressed upon said positive collector.

9. A cell as claimed in claim 1 wherein said separator comprises a porous polypropylene membrane.

10. A cell as claimed in claim 1 wherein said nonaqueous electrolyte comprises a liquid mixture having lithium perchlorate dissolved in a solvent mixture of propylene carbonate and 1,2-dimethoxyethane.

11. A rechargeable non-aqueous secondary cell comprising;
    a positive electrode having a rechargeable active material as a main component,
    a negative electrode formed of lithium-aluminum alloy including manganese in solid solution phases and/or $MnAl_6$,
    a separator disposed between said positive electrode and said negative electrode, and
    a non-aqueous electrolyte.

12. A cell as claimed in claim 11 wherein manganese is added in 0.1 to 6.0 wt. % with respect to aluminum.

13. A cell as claimed in claim 11 wherein the active material for the positive electrode comprises a manganese oxide.

14. A cell as claimed in claim 13 wherein said manganese oxide is selected from the group consisting of manganese dioxide, a manganese oxide including lithium or other metals, $Li_2MnO_3$, manganese dioxide including $Li_2MnO_3$, spinel type $Li_2MnO_4$.

15. A cell as claimed in claim 11 further comprising a negative can, and a negative collector secured to a bottom inside surface of said negative can.

16. A cell as claimed in claim 15 wherein said negative electrode is pressed upon said negative collector.

17. A cell as claimed in claim 11 further comprising a positive can, and a positive collector secured to a bottom inside surface of said positive can.

18. A cell as claimed in claim 17 wherein said positive electrode is pressed upon said positive collector.

19. A cell as claimed in claim 11 wherein said separator comprises a porous polypropylene membrane.

20. A cell as claimed in claim 11 wherein said nonaqueous electrolyte comprises a liquid mixture having lithium perchlorate dissolved in a solvent mixture of propylene carbonate and 1,2-dimethoxyethane.

* * * * *